United States Patent
Kawakami et al.

(10) Patent No.: US 8,845,488 B2
(45) Date of Patent: Sep. 30, 2014

(54) HYDRAULIC CONTROL APPARATUS AND HYDRAULIC CONTROL METHOD

(75) Inventors: Takaho Kawakami, Susono (JP); Shinya Fujimura, Susono (JP); Takahiro Yokokawa, Susono (JP); Yuji Hattori, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 650 days.

(21) Appl. No.: 13/133,056

(22) PCT Filed: Dec. 11, 2009

(86) PCT No.: PCT/IB2009/007717
§ 371 (c)(1),
(2), (4) Date: Jul. 6, 2011

(87) PCT Pub. No.: WO2010/067189
PCT Pub. Date: Jun. 17, 2010

(65) Prior Publication Data
US 2011/0269583 A1    Nov. 3, 2011

(30) Foreign Application Priority Data
Dec. 12, 2008  (JP) ................................. 2008-317535

(51) Int. Cl.
*F16H 61/662* (2006.01)

(52) U.S. Cl.
USPC ................................ 477/45; 477/46; 477/110

(58) Field of Classification Search
USPC ............ 477/45, 46, 48, 50, 107, 110; 474/28
See application file for complete search history.

(56) References Cited

U.S. PATENT DOCUMENTS

| | | | | |
|---|---|---|---|---|
| 8,251,870 B2 * | 8/2012 | Nihei et al. | ................... | 477/107 |
| 2009/0232673 A1 | 9/2009 | Reisch et al. | | |

FOREIGN PATENT DOCUMENTS

| | | |
|---|---|---|
| DE | 103 27 406 A1 | 2/2005 |
| DE | 10 2005 013 137 A1 | 9/2006 |
| EP | 0 764 799 A1 | 3/1997 |
| JP | A-03-134368 | 6/1991 |
| JP | A-04-181057 | 6/1992 |
| JP | B2-2893757 | 5/1999 |
| JP | A-2000-045807 | 2/2000 |
| JP | A-2001-227606 | 8/2001 |
| JP | A-2003-294124 | 10/2003 |
| JP | A-2006-226351 | 8/2006 |
| JP | A-2007-145050 | 6/2007 |
| WO | WO 2006/016797 A1 | 2/2006 |

OTHER PUBLICATIONS

Japanese Office Action issued in Application No. 2008-317535; Dated Oct. 15, 2010 (With Translation).
Written Opinion of the International Searching Authority issued in Application No. PCT/IB2009/007717; Dated Mar. 18, 2010.
International Search Report issued in Application No. PCT/IB2009/007717; Dated Mar. 18, 2010.

* cited by examiner

*Primary Examiner* — Jacob S Scott
(74) *Attorney, Agent, or Firm* — Oliff PLC

(57) ABSTRACT

If it is determined that a malfunction has occurred in an electrical hydraulic pump and the hydraulic fluid is not supplied to a high hydraulic pressure supplied portion from the electrical hydraulic pump, the hydraulic fluid is supplied to the high hydraulic pressure supplied portion from a mechanical hydraulic pump that usually supplies the hydraulic fluid to a low hydraulic pressure supplied portion. In this case, the hydraulic pressure that is generated by the mechanical hydraulic pump is increased by increasing the output from the engine that drives the mechanical hydraulic pump.

11 Claims, 7 Drawing Sheets

HYDRAULIC CONTROL APPARATUS AND HYDRAULIC CONTROL METHOD

BACKGROUND OF THE INVENTION

1. Field of the Invention

The invention relates to a hydraulic control apparatus and a hydraulic control method that are used to control a hydraulic pressure that is supplied to a low hydraulic pressure supplied portion and a hydraulic pressure that is supplied to a high hydraulic pressure supplied portion.

2. Description of the Related Art

Japanese Patent Application Publication No. 03-134368 (JP-A-03-134368) describes an example of an apparatus that supplies hydraulic pressures to a low hydraulic pressure supplied portion and a high hydraulic pressure supplied portion. According to the JP-A-03-134368, a high pressure oil pump is used to supply a hydraulic pressure to a pulley of a V-belt continuously variable transmission that requires a high hydraulic pressure, and a low pressure oil pump is used to supply a hydraulic fluid to a hydraulic clutch and a hydraulic power transmission that require a hydraulic fluid that has a relatively low hydraulic pressure but a high flow volume. Japanese Patent Application Publication No. 2006-226351 (JP-A-2006-226351) describes a hydraulic control apparatus. With this hydraulic control apparatus, in the case where different magnitudes of hydraulic pressures are supplied from single electrical oil pump, a load of the electrical oil pump is smoothly changed. Especially, when a circuit to which the electrical oil pump is connected is changed from a low pressure hydraulic circuit to a high pressure hydraulic circuit, the circuits are changed after the rotational speed of the electrical oil pump is decreased to a value equal to or lower than a predetermined value. Japanese Patent Application Publication No. 2000-45807 (JP-A-2000-45807) describes an apparatus that executes a vehicle engine stop control. With this apparatus, when an engine is automatically stopped, an electrical oil pump supplies oil to an automatic transmission. If the electrical hydraulic pump malfunctions, the engine is not automatically stopped. Japanese Patent Application Publication No. 2007-145050 (JP-A-2007-145050) describes a drive system for a vehicle that is able to travel using drive power generated by a motor. With this system, if a mechanical hydraulic pump and an electrical hydraulic pump, which supply hydraulic pressures to a hydraulic circuit for a transmission, malfunction and a required hydraulic pressure is not achieved, the torque that is output from the motor is limited.

According to JP-A-03-134368, because two types of oils pumps, that is, the low pressure oil pump and the high pressure oil pump, are provided, it is possible to supply the hydraulic pressures that are required by a torque converter, a clutch and the continuously variable transmission. As a result, the torque that is required to drive the oil pumps is reduced as a whole, and power loss and hydraulic pressure shortage are prevented or suppressed. However, with the configuration described in JP-A-03-134368, the oil pump that supplies a hydraulic pressure to the portion that requires a high hydraulic pressure and the oil pump that supplies a hydraulic pressure to the portion that requires a relatively low hydraulic pressure operate independently from each other. Therefore, if the high pressure oil pump malfunctions, a high hydraulic pressure is not supplied.

According to JP-A-2006-226351, changing the operating state of the electrical oil pump makes it possible to supply hydraulic pressures within a hydraulic pressure range from a relatively low hydraulic pressure to a relatively high hydraulic pressure. Therefore, if the electrical oil pump malfunctions, a required hydraulic pressure may not be supplied and power loss of the electrical oil pump may increase. In the control apparatus described in JP-A-2000-45807, the electrical oil pump is provided to avoid the situation where the hydraulic pressure goes away when the engine is restarted. Therefore, if the electrical oil pump malfunctions, the hydraulic pressure goes away. In addition, according to JP-A-2007-145050, if both the mechanical hydraulic pump and the electrical hydraulic pump malfunction and a sufficient hydraulic pressure that needs to be supplied to the transmission is not achieved, the torque that is output from the motor is limited. Therefore, it is possible to suppress damage to the transmission due to hydraulic pressure shortage. However, with the configuration described in JP-A-2007-145050, the torque that is output from the motor is limited to the minimum torque at which damage is not given to the transmission. Therefore, the drive torque corresponding to a requested travel motion may not be achieved.

SUMMARY OF THE INVENTION

The invention provides a hydraulic control apparatus and a hydraulic control method that are used to maintain the drive state even if an electrical hydraulic pump malfunctions.

A first aspect of the invention relates to a hydraulic control apparatus that includes: a high hydraulic pressure supplied portion which includes a continuously variable transmission mounted in a vehicle, and to which a relatively high hydraulic pressure is supplied from an electrical hydraulic pump that is driven by a motor; a low hydraulic pressure supplied portion to which a hydraulic pressure that is lower than the hydraulic pressure supplied from the electrical hydraulic pump is supplied from a mechanical hydraulic pump that is driven by an engine; a malfunction detection unit that determines whether the electrical hydraulic pump malfunctions; a discharge pressure increasing unit that increases a volume of hydraulic fluid that is discharged from the mechanical hydraulic pump and increases the hydraulic pressure that is generated by the mechanical hydraulic pump, if the malfunction detection unit determines that the electrical hydraulic pump malfunctions; and an oil supply passage through which, when the hydraulic pressure that is generated by the mechanical hydraulic pump is increased to a relatively high hydraulic pressure by the discharge pressure increasing unit, at least part of the hydraulic fluid of which the hydraulic pressure is increased to the relatively high hydraulic pressure is supplied to the high hydraulic pressure supplied portion.

According to the first aspect of the invention described above, if the malfunction detection unit determines that the electrical hydraulic pump malfunctions, the discharge pressure increasing unit increases the volume of hydraulic fluid that is discharged from the mechanical hydraulic pump and increases the hydraulic pressure that is generated by the mechanical hydraulic pump. Then, at least part of the hydraulic fluid of which the hydraulic pressure is increased to the relatively high hydraulic pressure is supplied to the high hydraulic pressure supplied portion through the oil supply passage. As described above, if the electrical hydraulic pump malfunctions, it is possible to generate a relatively high hydraulic pressure with the use of the mechanical hydraulic pump, and to supply the hydraulic fluid having the relatively high hydraulic pressure to the high hydraulic pressure supplied portion. Also, the hydraulic fluid may be confined by the oil supply passage. Therefore, it is possible to suppress or reduce a decrease in the hydraulic pressure in the high hydraulic pressure supplied portion. Also, it is possible to suppress or reduce shortage of the flow volume of the hydraulic fluid. As a result, it is possible to maintain the drive state as much as possible, and the vehicle is able to keep traveling.

In the first aspect of the invention described above, if the malfunction detection unit determines that the electrical hydraulic pump malfunctions, the discharge pressure increasing unit may increase a rotational speed of the engine in response to a command to increase the hydraulic pressure that is supplied from the mechanical hydraulic pump.

According to the configuration described above, the discharge pressure increasing unit increases the rotational speed of the engine in response to a command to increase the hydraulic pressure that is supplied from the mechanical hydraulic pump. Because the mechanical hydraulic pump is driven by the engine, if the rotational speed of the engine is increased, the rotational speed of the mechanical hydraulic pump is increased and the hydraulic pressure that is generated by the mechanical hydraulic pump is increased.

The hydraulic control apparatus according to the first aspect of the invention may further include an input torque limiting unit that calculates an upper limit input torque which is an upper limit of torque that is allowed to be input in the high hydraulic pressure supplied portion based on a volume or a hydraulic pressure of hydraulic fluid that is allowed to be supplied to the high hydraulic pressure supplied portion and that limits a torque that is input from the engine to the high hydraulic pressure supplied portion, if the malfunction detection unit determines that the electrical hydraulic pump malfunctions.

According to the configuration described above, the input torque limiting unit calculates the upper limit input torque which is the upper limit of torque that is allowed to be input in the high hydraulic pressure supplied portion based on the volume or the hydraulic pressure of the hydraulic fluid that is allowed to be supplied to the high hydraulic pressure supplied portion, and limits the torque that is input from the engine to the high hydraulic pressure supplied portion to the upper limit input torque. Therefore, it is possible to transmit torque and change the speed ratio within the torque range and speed ratio range that correspond to the range of hydraulic pressure that may be actually supplied to the high hydraulic pressure supplied portion or the range of volume of hydraulic fluid that may be actually supplied to the high hydraulic pressure supplied portion. In other words, it is possible to avoid the situation where a torque that falls outside the range of torque that may be transmitted at the hydraulic pressure that is actually supplied to the high hydraulic pressure supplied portion or at the volume of hydraulic fluid that is actually supplied to the high hydraulic pressure supplied portion. Therefore, it is possible to maintain the drive state as much as possible, and the vehicle is able to keep traveling.

The hydraulic control apparatus according to the first aspect of the invention may further include a speed ratio change rate limiting unit that limits a rate of change in a speed ratio, which is caused by the continuously variable transmission in response to a speed ratio change command, to a value equal to or lower than a value that is determined based on a parameter that indicates an operating state of the mechanical hydraulic pump, if the malfunction detection unit determines that the electrical hydraulic pump malfunctions.

According to the configuration described above, the continuously variable transmission is supplied with a relatively high hydraulic pressure that is generated by the mechanical hydraulic pump instead of the electrical hydraulic pump in which a malfunction has occurred. When the speed ratio change command is provided to the continuously variable transmission, the rate of change in the speed ratio is limited to a value equal to or lower than the value that is determined based on the parameter that indicates the operating state of the mechanical hydraulic pump. Therefore, it is possible to change the speed ratio at the speed ratio change rate that corresponds to the operating state of the mechanical hydraulic pump. Also, it is possible to achieve the hydraulic pressure at which the speed ratio can be changed. As a result, it is possible to maintain the drive state as much as possible, and the vehicle is able to keep traveling.

In the first aspect described above, the continuously variable transmission may be a belt continuously variable transmission in which a groove width of a pulley over which a belt is looped is changed by moving a movable sheave of the pulley using a hydraulic pressure. In addition, the hydraulic control apparatus may further include a speed ratio change range limiting unit that limits a range of speed ratio change that is caused by the belt continuously variable transmission in response to a speed ratio change command, if the malfunction detection unit determines that the electrical hydraulic pump malfunctions.

According to the configuration described above, the continuously variable transmission is a belt continuously variable transmission, and the belt continuously variable transmission is supplied with a relatively high hydraulic pressure that is generated by the mechanical hydraulic pump instead of the electrical hydraulic pump in which a malfunction has occurred. If a speed ratio change command is provided to the belt continuously variable transmission, the range of speed ratio change is limited by the speed ratio range limiting unit. Therefore, it is possible to change the speed ratio to a speed ratio that corresponds to the operating state of the mechanical hydraulic pump. Also, it is possible to achieve the hydraulic pressure at which the speed ratio can be changed. As a result, it is possible to maintain the drive state as much as possible, and the vehicle is able to keep traveling.

In the configuration described above, a moving range for the movable sheave may be set based on a volume or a hydraulic pressure of a hydraulic fluid that is supplied to the high hydraulic pressure supplied portion; and the speed ratio change range limiting unit may limit a target speed ratio in such a manner that the speed ratio changes within a range of speed ratio change, which corresponds to the set moving range for the movable sheave.

According to the configuration described above, the moving range for the movable sheave is set based on the volume or the hydraulic pressure of the hydraulic fluid that is supplied to the high hydraulic pressure supplied portion, and the speed ratio change range limiting unit limits the target speed ratio in such a manner that the speed ratio changes within the range of speed ratio change, which corresponds to the set moving range for the movable sheave. Accordingly, it is possible to change the speed ratio based on the volume or the hydraulic pressure that may be achieved by mechanical hydraulic pump.

In the first aspect of the invention described above, the malfunction detection unit may determine that the electrical hydraulic pump malfunctions if the difference between the hydraulic pressure that is actually supplied to the high hydraulic pressure supplied portion and a command hydraulic pressure for the electrical hydraulic pump is equal to or larger than a predetermined value.

According to the configuration described above, the malfunction detection unit determines that the electrical hydraulic pump malfunctions if the difference between the hydraulic pressure that is actually supplied to the high hydraulic pressure supplied portion and the command hydraulic pressure for the electrical hydraulic pump is equal to or larger than a predetermined value. Therefore, it becomes easier to determine whether the electrical hydraulic pump malfunctions.

A second aspect of the invention relates to a method for controlling a hydraulic apparatus that includes a high hydraulic pressure supplied portion which includes a continuously variable transmission mounted in a vehicle, and to which a relatively high hydraulic pressure is supplied from an electrical hydraulic pump that is driven by a motor, and a low hydraulic pressure supplied portion to which a hydraulic pressure that is lower than the hydraulic pressure supplied from the electrical hydraulic pump is supplied from a mechanical hydraulic pump that is driven by an engine. According to the method, whether the electrical hydraulic pump malfunctions is determined; and a volume of hydraulic fluid that is discharged from the mechanical hydraulic pump is increased and the hydraulic pressure that is generated by the mechanical hydraulic pump is increased, if it is determined that the electrical hydraulic pump malfunctions. When the hydraulic pressure that is generated by the mechanical hydraulic pump is increased to a relatively high hydraulic pressure, at least part of the hydraulic fluid of which the hydraulic pressure is increased to the relatively high hydraulic pressure is supplied to the high hydraulic pressure supplied portion.

BRIEF DESCRIPTION OF THE DRAWINGS

The features, advantages and technical and industrial significance of this invention will be described in the following detailed description of an example embodiment of the invention with reference to the accompanying drawings, in which like numerals denote like elements, and wherein.

DETAILED DESCRIPTION OF THE EMBODIMENT

Hereafter, an embodiment of the invention will be described with reference to the accompanying drawings. A hydraulic control apparatus 1 according to the embodiment of the invention is applicable to machines and systems in various fields such as a vehicle Ve, an aircraft, a vessel, and an industrial machine. The invention is applicable to the hydraulic control apparatus 1 that includes at least two types of hydraulic pressure supplied portions, that is, a low hydraulic pressure supplied portion 2 and a high hydraulic pressure supplied portion 3, and that supplies hydraulic pressures to these hydraulic pressure supplied portions individually.

Figure 7:
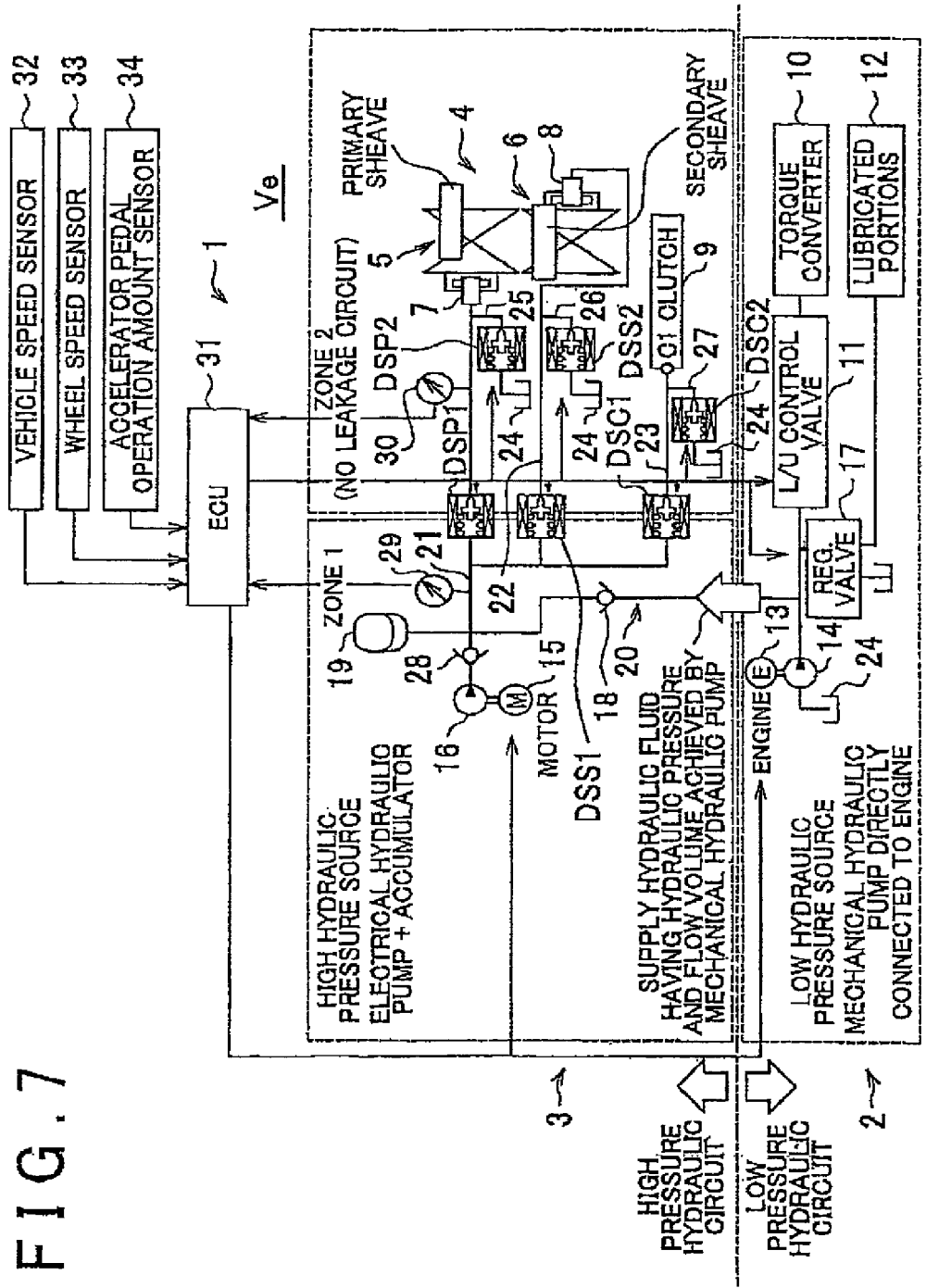
FIG. 7 is a view schematically showing the continuously variable transmission to which the embodiment of the invention is applicable.

FIG. 7 is a view schematically showing an example in which the invention is applied to the hydraulic control apparatus 1 for a power transmission system that includes a continuously variable transmission 4, which is mounted in the vehicle Ve. The continuously variable transmission 4 is an existing belt continuously variable transmission in which a belt (not shown) is looped over a drive pulley 5 and a driven pulley 6 to transmit torque between the pulleys 5 and 6, and which changes the speed ratio by changing the effective diameters of the pulleys 5 and 6. More specifically, each of the pulleys 5 and 6 has a stationary sheave and a movable sheave that is arranged so as to approach and move away from the stationary sheave, and a V-shaped belt holding groove is formed between the stationary sheave and the movable sheave. In addition, the pulleys 5 and 6 are provided with hydraulic actuators 7 and 8 used to move the movable sheaves in the axial direction thereof, respectively. One of the hydraulic actuators 7 and 8, for example, the hydraulic actuator 8 for the driven pulley 6 is supplied with a hydraulic pressure used to generate a belt holding pressure, and the other of the hydraulic actuators 7 and 8, for example, the hydraulic actuator 7 for the drive pulley 5 is supplied with a hydraulic pressure used to change the effective diameters of the pulleys to change the speed ratio.

A C1 clutch 9 used to permit or interrupt transmission of a drive torque is provided on the input side or the output side of the continuously variable transmission 4. The transmission torque capacity of the C1 clutch 9 is set based on the supplied hydraulic pressure, and is formed of, for example, a wet multi-disc clutch. The continuously variable transmission 4 and the C1 clutch 9 are used to transmit the torque for moving the vehicle Ve, and the transmission torque capacity is set based on the supplied hydraulic pressure. Therefore, a high hydraulic pressure corresponding to the torque is supplied to the hydraulic actuators 7 and 8 and the C1 clutch 9. Therefore, the continuously variable transmission 4 or the hydraulic actuators 7 and 8 thereof, and the C1 clutch 9 or a hydraulic chamber thereof (not shown) each correspond to the high hydraulic pressure supplied portion 3 according to the embodiment of the invention.

The power transmission system that includes the continuously variable transmission 4 includes a torque converter 10 that is provided with a lock-up clutch (not shown). The torque converter 10 has an existing structure. That is, in a converter range where the difference between the rotational speed of a pump impeller and the rotational speed of a turbine runner is large and the ratio of speed is lower than a predetermined value, the torque is amplified. In a coupling range where the difference between the rotational speed of the pump impeller and the rotational speed of the turbine runner is small and the ratio of speed is higher than the predetermined value, the torque converter 10 serves as a fluid coupling that does not amplify the torque. The lock-up clutch is configured so as to directly connect a front cover that is integrally formed with the pump impeller, which is an input side member, and a hub integrally formed with the turbine runner with each other via a friction plate.

A L/U control valve 11 used to control a lock-up hydraulic pressure for causing the friction plate to contact or move away from the front cover is provided. The L/U control valve 11 is used to control the direction in which the hydraulic fluid is supplied to the lock-up clutch and the pressure of the hydraulic fluid. Therefore, the L/U control valve 11 is configured to operate at a relatively low hydraulic pressure.

In addition, in the power transmission system that includes the continuously variable transmission 4 and the torque converter 10, there are many portions at which components slide with respect to each other or portions at which heat is generated, for example, portions at which components frictionally contact each other and bearings. The lubrication oil (hydraulic fluid) is supplied to these portions. These portions are referred to as lubricated portions 12. These lubricated portions 12 need to be supplied with a required volume of lubrication oil (hydraulic fluid) even if the pressure of the lubrication oil is low. Therefore, the lubricated portions 12 and the L/U control valve 11 or the torque converter 10 each correspond to the low hydraulic pressure supplied portion 2 according to the embodiment of the invention.

Next, the structure used to supply/discharge the hydraulic pressure to/from the high hydraulic pressure supplied portion 3 and the low hydraulic pressure supplied portion 2 will be described. FIG. 7 schematically shows the low hydraulic pressure supplied portion 2 of which a hydraulic pressure source is a mechanical hydraulic pump 14 that is driven by an engine 13 mounted in the vehicle Ve, and the high hydraulic pressure supplied portion 3 of which a hydraulic pressure source is an electrical hydraulic pump 16 that is driven by a motor 15. The engine 13 is a thermal engine, for example, a gasoline engine, which outputs power by burning fuel.

A regulator valve 17 that adjusts the hydraulic pressure generated by the mechanical hydraulic pump 14 to a predetermined pressure is provided. The regulator valve 17 is used to adjust the original pressure for control. The L/U control valve 11 and the lubricated portions 12 are communicated with a downstream side portion of the regulator valve 17. That is, the hydraulic pressure that is achieved by reducing the original pressure at the regulator valve 17 (line pressure) is supplied to low hydraulic pressure supplied portion 2 that includes the L/U control valve 11 and the lubricated portions 12.

An outlet of the mechanical hydraulic pump 14 is communicated with an original pressure oil passage in the high hydraulic pressure supplied portion 3 or an accumulator 19 via a check valve 18. The check valve 18 is a one-way valve that opens when the hydraulic fluid flows from the mechanical hydraulic pump 14 toward the high hydraulic pressure supplied portion 3 and that closes when the hydraulic fluid flows from the high hydraulic pressure supplied portion 3 toward the mechanical hydraulic pump 14. The oil passage in which the check valve 18 is provided corresponds to an oil supply passage 20 in the embodiment of the invention. The accumulator 19 is configured in such a manner that a piston pushed by an elastic body or an elastic expansion body is pushed into an accumulator chamber of a container and the hydraulic pressure equal to or higher than an elastic force is accumulated therein. The hydraulic fluid is supplied from the accumulator 19 to the high hydraulic pressure supplied portion 3. That is, the actuator 7 for the drive pulley 5, the actuator 8 for the driven pulley 6 and the C1 clutch 9 are communicated with the accumulator 19. The hydraulic pressure accumulated in the accumulator 19 is higher than the maximum value of the pressure that is required by the continuously variable transmission 4.

The actuator 7 for the drive pulley 5, the actuator 8 for the driven pulley 6, the C1 clutch 9 and the accumulator 19 each correspond to the high hydraulic pressure supplied portion 3 in the embodiment of the invention.

A supply-side on-off valve DSP1 is provided in an oil passage 21 through which the hydraulic fluid is supplied from the electrical hydraulic pump 16 and the accumulator 19 to the actuator 7 for the drive pulley 5. The supply-side on-off valve DSP1 is electrically controlled, whereby the oil passage 21 is opened to supply the hydraulic fluid to the actuator 7 or the oil passage 21 is closed to shut off the supply of the hydraulic fluid to the actuator 7. Similarly, a supply-side on-off valve DSS1 is provided in an oil passage 22 through which the hydraulic fluid is supplied from the electrical hydraulic pump 16 and the accumulator 19 to the actuator 8 for the driven pulley 6. The supply-side on-off valve DSS1 is electrically controlled, whereby the oil passage 22 is opened to supply the hydraulic fluid to the actuator 8 or the oil passage 22 is closed to shut off the supply of the hydraulic fluid to the actuator 8. In addition, a supply-side on-off valve DSC1 is provided in an oil passage 23 through which the hydraulic fluid is supplied from the electrical hydraulic pump 16 and the accumulator 19 to the C1 clutch 9. The supply-side on-off valve DSC1 is electrically controlled, whereby the oil passage 23 is opened to supply the hydraulic fluid to the C1 clutch 9 or the oil passage 23 is closed to shut off the supply of the hydraulic fluid to the C1 clutch 9.

A drain-side on-off valve DSP2 is provided in an oil drain passage 25 that provides communication between the actuator 7 for the drive pulley 5 and a portion to which the hydraulic fluid is drained, for example, an oil pan 24. The drain-side on-off valve DSP2 is electrically controlled, whereby the oil drain passage 25 is opened to drain the hydraulic fluid from the actuator 7 or the oil drain passage 25 is closed to shut off the drainage of the hydraulic fluid from the actuator 7. Similarly, a drain-side on-off valve DSS2 is provided in an oil drain passage 26 through which the hydraulic fluid is drained from the actuator 8 for the driven pulley 6. The drain-side on-off valve DSS2 is electrically controlled, whereby the oil drain passage 26 is opened to drain the hydraulic fluid from the actuator 8 or the oil drain passage 26 is closed to shut off the drainage of the hydraulic fluid from the actuator 8. In addition, a drain-side on-off valve DSC2 is provided in an oil drain passage 27 through which the hydraulic fluid is drained from the C1 clutch 9. The drain-side on-off valve DSC2 is electrically controlled, whereby the oil drain passage 27 is opened to drain the hydraulic fluid from the C1 clutch 9 or the oil drain passage 27 is closed to shut off the drainage of the hydraulic fluid from the C1 clutch 9. These on-off valves DSP1, DSS1, DSC1, DSP2, DSS2 and DSC2 are valves that are configured in such a manner that the hydraulic pressure does not decrease even in the closed state. These on-off valves are formed of, for example, electromagnetic valve over which the duty control is executed.

The hydraulic pressure generated by the electrical hydraulic pump 16 is supplied to the above-described supply-side on-off valves via an electrical hydraulic pump check valve 28 that is provided in the oil passage 21, adjusted, and then supplied to the actuator 7 for the drive pulley 5, the actuator 8 for the driven pulley 6 and the C1 clutch 9. The electrical hydraulic pump check valve 28 is a one-way valve that opens when the hydraulic fluid flows from the electrical hydraulic pump 16 toward the high hydraulic pressure supplied portion 3, and that closes when the hydraulic fluid flows from the high hydraulic pressure supplied portion 3 toward the electrical hydraulic pump 16. Therefore, the electrical hydraulic pump check valve 28 prevents the hydraulic fluid from flowing out of the high hydraulic pressure supplied portion 3 when the electrical hydraulic pump 16 does not supply the hydraulic fluid.

The mechanical hydraulic pump 14 is connected to the engine 13. Therefore, when the engine 13 rotates, the mechanical hydraulic pump 14 also rotates and generates a hydraulic pressure. The engine 13 rotate in both the case where fuel is supplied to the engine 13 and the engine 13 self-operates and the case where fuel supply and ignition are suspended and the engine 13 is forcibly rotated by an inertia force of the vehicle Ve. That, is, the mechanical hydraulic pump 14 rotates and generates a hydraulic pressure in both the case where the engine 13 self-operates and the case where the engine 13 is forcibly rotated, that is, the case where engine brake is applied. The pressure and the oil quantity are determined based on the specification, the rotational speed and the torque of the mechanical hydraulic pump 14, and the generated hydraulic pressure is adjusted to a predetermined low hydraulic pressure by the regulator valve 17, supplied to the torque converter 10 via the L/U control valve 11, and then supplied to the lubricated portions 12.

The mechanical hydraulic pump 14 generates the hydraulic pressure that corresponds to the operating state of the engine 13 such as the rotational speed of the engine 13 and the torque generated by the engine 13. Therefore, the pressure that is discharged from the mechanical hydraulic pump 14 increases, for example, when the vehicle Ve is suddenly accelerated or a great engine braking force is generated. The relatively high hydraulic pressure that is generated in these cases opens the check valve 18, and is then supplied to the accumulator 19 provided in the high hydraulic pressure supplied portion 3.

The transmission torque capacity of the continuously variable transmission 4 is adjusted to a capacity at which the input torque is sufficiently transmitted. The capacity is set based on the belt holding force corresponding to the hydraulic pressure that is supplied to the actuator 8 for the driven pulley 6. More specifically, the belt holding force is controlled based on the required drive power that is determined based on, for example, the accelerator pedal operation amount and the throttle valve opening amount. As the required drive power increases, the hydraulic pressure that is supplied to the actuator 8 for the driven pulley 6 increases, whereby the belt holding force is controlled. The hydraulic pressure that is supplied to the actuator 8 is increased by opening the supply-side on-off valve DSS1 that communicates with the actuator 8 for the driven pulley 6 so that the hydraulic pressure that is generated by the electrical hydraulic pump 16 and the hydraulic pressure that is supplied from the accumulator 19 are supplied to the actuator 8. The open-close control over the supply-side on-off valve DSS1 may be executed based on the target pressure for the actuator 8 for the driven pulley 6 (or the target belt holding force) and the actual hydraulic pressure in the actuator 8. Therefore, preferably, a sensor (not shown) that detects the actual hydraulic pressure in the actuator 8 is provided.

When the belt holding force is decreased in response to a decrease in the torque that is input in the continuously variable transmission 4, the drain-side on-off valve DSS2 that is communicated with the actuator 8 for the driven pulley 6 is opened. That is, electric power is supplied to an electromagnetic coil to move a valve body away from a valve seat so that the actuator 8 is communicated with a drain portion. The electric power supply control over the drain-side on-off valve DSS2 may be executed based on the target pressure for the actuator 8 for the driven pulley 6 (or the target belt holding force) and the actual hydraulic pressure in the actuator 8.

The hydraulic pressure that is supplied from the electrical hydraulic pump 16 and the accumulator 19 is detected by a hydraulic sensor 29 that is provided in an upstream portion of the oil passage 21 that extends from the hydraulic pressure source. The hydraulic pressure that is supplied to the hydraulic actuator 7 for the drive pulley 5 is detected by a hydraulic sensor 30 that is provided in a downstream portion of the oil passage 21 that extends from the hydraulic pressure source. In FIG. 7, the region which is on the upstream side of the supply-side on-off valves DSP1, DSS1, and DSC1 and in which the hydraulic pressure is detected by the hydraulic sensor 29 is referred to as Zone 1, and the region which is on the downstream side of the supply-side on-off valves DSP1, DSS1, and DSC1 and in which the hydraulic pressure is detected by the hydraulic sensor 30 is referred to as Zone 2. The region formed by combining Zone 1 and Zone 2 corresponds to the high hydraulic pressure supplied portion 3.

The speed ratio achieved by the continuously variable transmission 4 is obtained according to a shift map based on the required amount of drive power, for example, the accelerator pedal operation amount, and the vehicle speed V or the turbine speed. Accordingly, the groove width of the drive pulley 5 is adjusted in such a manner that the target speed ratio is achieved. The groove width of the drive pulley 5 is adjusted by supplying/draining the hydraulic fluid to/from the actuator 7 for the drive pulley 5. More specifically, the groove width of the drive pulley 5 is adjusted by executing the open-close control over the supply-side on-off valve DSP1 and the drain-side on-off valve DSP2. For example, when the groove width of the drive pulley 5 is decreased, that is, the effective diameter of the drive pulley 5 is increased to perform upshifting, the supply-side on-off valve DSP1 is opened so that the hydraulic fluid having a high pressure, which is generated by the electrical hydraulic pump 16, and the hydraulic fluid from the accumulator 19 are supplied to the actuator 7. On the other hand, when the groove width of the drive pulley 5 is increased and the effective diameter of the drive pulley 5 is decreased to perform downshifting, the drain-side on-off valve DSP2 is opened so that the hydraulic pressure is discharged from the actuator 7.

The open-close control over the supply-side on-off valve DSP1 and the drain-side on-off valve DSP2 for controlling the speed ratio may be executed based on the amount by which the movable sheave of the drive pulley 5 is moved, the result of comparison between the target speed ratio and the actual speed ratio, which is the ratio between the engine speed or the input rotational speed and the output rotational speed, or the result of comparison between the pressure at the actuator 7 for the drive pulley 5 and the pressure at the actuator 8 of the driven pulley 6.

In the steady travel state in which the accelerator pedal operation amount and the vehicle speed V are maintained substantially constant, the speed ratio and the belt holding force are maintained constant. In this case, the on-off valves DSP1, DSP2, DSS1, and DSS2 for the continuously variable transmission 4 are placed in the off state so that the oil passages 21 and 22 and the oil drain passages 25 and 26 are closed and the hydraulic fluid is confined in the actuators 7 and 8.

When the vehicle Ve travels, the C1 clutch 9 may be engaged to transmit a torque to drive wheels (not shown). Therefore, a high torque that is required to cause the vehicle Ve to travel is transmitted via the C1 clutch 9. Accordingly, when the vehicle Ve travels, a hydraulic pressure is supplied from the electrical hydraulic pump 16 and the accumulator 19 to the C1 clutch 9. That is, when the vehicle Ve starts, electric power is supplied to the supply-side on-off valve DSC1 provided in the oil passage 23 for the C1 clutch 9 to open the supply-side on-off valve DSC1. Then, the hydraulic pressure is supplied from the electrical hydraulic pump 16 and the accumulator 19 to the C1 clutch 9, whereby the C1 clutch 9 is engaged.

Preferably, the pressure for engaging the C1 clutch 9 is gradually increased by repeatedly opening and closing the supply-side on-off valve DSC1 within a short time so that abrupt engagement of the C1 clutch 9 is avoided. Alternatively, the accumulator 19 may be provided on the supply side of the C1 clutch 9 and the pressure for engaging the C1 clutch 9 may be gradually increased based on the characteristics of the accumulator 19. When the C1 clutch 9 is disengaged, the on-control is executed over the drain-side on-off valve DSC2 to discharge the hydraulic pressure from the C1 clutch 9. In this case as well, preferably, the drain-side on-off valve DSC2 is repeatedly opened and closed within a short time or the pressure is gradually discharged by the accumulator 19 in order to gradually disengage the C1 clutch 9.

There is provided an electronic control unit (ECU) 31 that controls the above-described on-off valves DSP1, DSS1, DSC1, DSP2, DSS2, and DSC2, the engine 13 and the motor 15 to control the speed ratio of the continuously variable transmission 4. The electronic control unit (ECU) 31 is formed mainly of a microcomputer, and executes computations with the use of the received data and the data and programs stored in advance. The ECU 31 outputs the results of computations to various controlled portions as command signals.

The ECU 31 receives, as data, a detection signal indicating the vehicle speed V from a vehicle speed sensor 32, a signal indicating the wheel speed detected by a wheel speed sensor 33, a signal from an accelerator pedal operation amount sensor 34 that detects the depression amount of an accelerator pedal, an actual hydraulic pressure detection signal from the hydraulic sensor 29 that detects the hydraulic pressure supplied from the electrical hydraulic pump 16, an actually supplied hydraulic pressure detection signal from the hydraulic sensor 30 that detects the hydraulic pressure that is supplied to the drive pulley 5.

Figure 1:
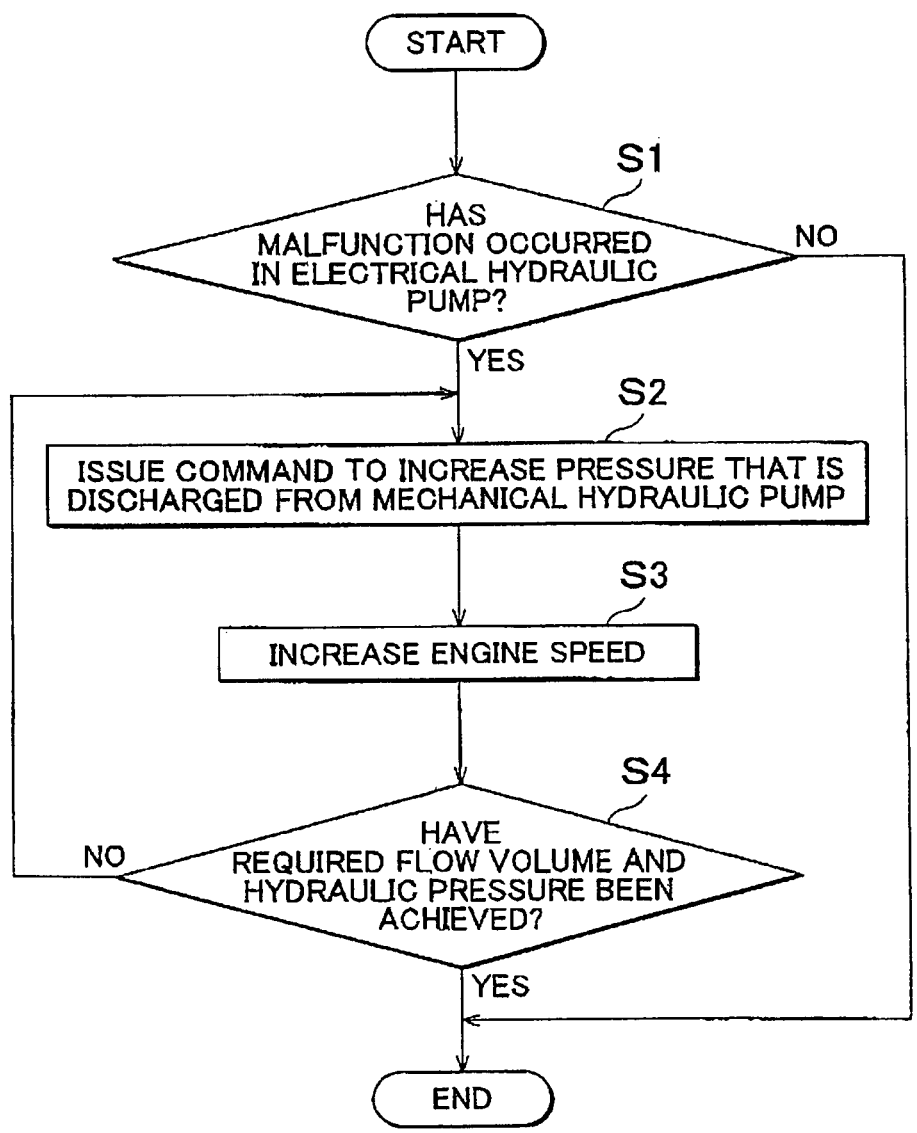
FIG. 1 is a flowchart schematically showing an example of a control that is executed by a hydraulic control apparatus according to an embodiment of the invention.

The hydraulic control apparatus 1 according to the embodiment of the invention is configured in such a manner that if the above-described electrical hydraulic pump 16 malfunctions, the hydraulic pressure generated by the mechanical hydraulic pump 14 is supplied to the high hydraulic pressure supplied portion 3 so that the speed ratio of the continuously variable transmission 4 is changed. FIG. 1 shows an example of a control executed by the hydraulic control apparatus 1. In the control example shown in FIG. 1, first, it is determined whether a malfunction has occurred in the electrical hydraulic pump 16 that supplies a relatively high hydraulic pressure to the high hydraulic pressure supplied portion 3 (step (hereinafter, referred to as "S") 1). If the actual hydraulic pressure detected by the hydraulic sensor 29 is lower than a command hydraulic pressure by an amount equal to or larger than a threshold that is set in advance, it is determined that a malfunction has occurred in the electrical hydraulic pump 16 and an affirmative determination is made in S1. On the other hand, if the difference between the actual hydraulic pressure detected by the hydraulic sensor 29 and the command hydraulic pressure does not exceed the threshold that is set in advance, it is determined that a malfunction has not occurred in the electrical hydraulic pump 16.

If an affirmative determination is made in S1, that is, if it is determined that a malfunction has occurred in the electrical hydraulic pump 16, a command to increase the pressure that is discharged from the mechanical hydraulic pump 14 is issued to increase the hydraulic pressure that is generated by the mechanical hydraulic pump 14 (S2). The mechanical hydraulic pump 14 is driven by the engine 13 to generate a hydraulic pressure. Therefore, in order to increase the hydraulic pressure that is generated by the mechanical hydraulic pump 14, the torque that is used to drive the mechanical hydraulic pump 14 need to be increased. Therefore, in S2, the torque that is required by the mechanical hydraulic pump 14 in order to increase the hydraulic pressure that is generated by the mechanical hydraulic pump 14 is calculated. The calculation is executed according to the following equations.

$$P_{SMOP} = P_{SEOPMAX} \quad (1)$$

$$\Delta Q_{SMOP} = Q_{SEOP} \quad (2)$$

The command pressure $P_{SMOP}$ that indicates the amount by which the hydraulic pressure that is generated by the mechanical hydraulic pump 14 should be increased is adjusted to the maximum pressure $P_{SEOPMAX}$, which is the maximum value of the hydraulic pressure that is generated by the electrical hydraulic pump 16, as indicated by Equation 1. The amount $\Delta Q_{SMOP}$ by which the flow volume of the hydraulic fluid that is supplied from the mechanical hydraulic pump 14 should be increased is adjusted to the flow volume $Q_{SEOP}$ that is required by the high hydraulic pressure supplied portion 3 as indicated by Equation 2. That is, control is executed in such a manner that the amount of increase in the flow volume of the hydraulic fluid that is supplied from the mechanical hydraulic pump 14 corresponds to the flow volume of the hydraulic fluid that is supplied from the electrical hydraulic pump 16.

Subsequent to or in parallel with the control in S2, the amount by which the rotational speed of the engine 13 should be increased is calculated. The rotational speed of the engine 13 is increased (S3). The control for increasing the engine speed is the control for increasing the hydraulic pressure that is generated by the mechanical hydraulic pump 14 to increase the flow volume of the hydraulic fluid that is supplied to the high hydraulic pressure supplied portion 3. Therefore, if the rotational speed of the engine 13 is increased, the rotational speed of the mechanical hydraulic pump 14 is increased. Thus, the hydraulic pressure that is generated by the mechanical hydraulic pump 14 is increased, and the flow volume of the hydraulic fluid that is supplied from the mechanical hydraulic pump 14 is increased. The hydraulic fluid is supplied to the high hydraulic pressure supplied portion 3 through the oil supply passage 20 which provides communication between the low hydraulic pressure supplied portion 2 and the high hydraulic pressure supplied portion 3 and in which the check valve 18 is provided.

Next, it is determined whether the flow volume and the hydraulic pressure of the hydraulic fluid, which are required by the high hydraulic pressure supplied portion 3, have been achieved (S4). Whether the required flow volume and hydraulic pressure of the hydraulic fluid have been achieved is determined by determining whether the difference between the actual hydraulic pressure of the hydraulic fluid that is supplied to the high hydraulic pressure supplied portion 3 and the command hydraulic pressure for the electrical hydraulic pump 16, which is obtained based on the amount of required drive power, for example, the accelerator pedal operation amount, is smaller than a threshold set in advance, as in the case where it is determined whether a malfunction has occurred in the electrical hydraulic pump 16. If the difference between the hydraulic pressure that is generated by the mechanical hydraulic pump 14 and the command hydraulic pressure does not exceed the threshold and the flow volume and the hydraulic pressure that are required by the high hydraulic pressure supplied portion 3 have been achieved, an affirmative determination is made in S4. On the other hand, if the required flow volume and hydraulic pressure have not been achieved, a negative determination is made in S4.

Whether the required flow volume and hydraulic pressure have been achieved is determined based on the result of comparison between the command hydraulic pressure for the electrical hydraulic pump 16 and the detection signals from the hydraulic sensors 29 and 30, or the flow volume of the hydraulic fluid that is supplied to the drive pulley 5 to change the effective diameter of the drive pulley 5 of the continuously variable transmission 4 or the hydraulic pressure that is supplied to the driven pulley 6 to set the belt holding force that corresponds to the speed ratio.

If an affirmative determination is made in S4, that is, if it is determined that the flow volume and the hydraulic pressure of the hydraulic fluid, which are required by the high hydraulic pressure supplied portion 3, have been achieved, the routine ends. On the other hand, if a negative determination is made in S4, that is, if it is determined that the flow volume and the hydraulic pressure of the hydraulic fluid are insufficient, S2 is executed again and control is executed in such a manner that the hydraulic pressure that is generated by the mechanical hydraulic pump 14 is increased. If a negative determination is made in S1, it is determined that a malfunction has not occurred in the electrical hydraulic pump 16, and the routine ends.

In the hydraulic control apparatus 1 according to the embodiment of the invention, if a malfunction has occurred in the electrical hydraulic pump 16, the rotational speed of the engine 13 is increased so that the volume of hydraulic fluid that is discharged from the mechanical hydraulic pump 14 driven by the engine 13 is increased. Then, the hydraulic pressure of the hydraulic fluid that is discharged from the mechanical hydraulic pump 14 is adjusted to a relatively high hydraulic pressure, that is, the hydraulic pressure is increased, and the volume of hydraulic fluid that is discharged from the mechanical hydraulic pump 14 is increased. Therefore, the hydraulic fluid is supplied after the flow volume of the hydraulic fluid is increased. Therefore, even if the flow volume and the hydraulic pressure of the hydraulic fluid that is supplied from the electrical hydraulic pump 16 are not sufficient, the flow volume and the hydraulic pressure of the hydraulic fluid, which are required by the continuously variable transmission 4, are achieved by the mechanical hydraulic pump 14. Therefore, it is possible to maintain the speed ratio. In addition, because the required flow volume and hydraulic pressure of the hydraulic fluid are maintained, it is possible to prevent or suppress a decrease in the belt holding force due to insufficient flow volume and hydraulic pressure of the hydraulic fluid, and to maintain the drive state as much as possible. As a result, the vehicle Ve is able to keep traveling.

Figure 2:
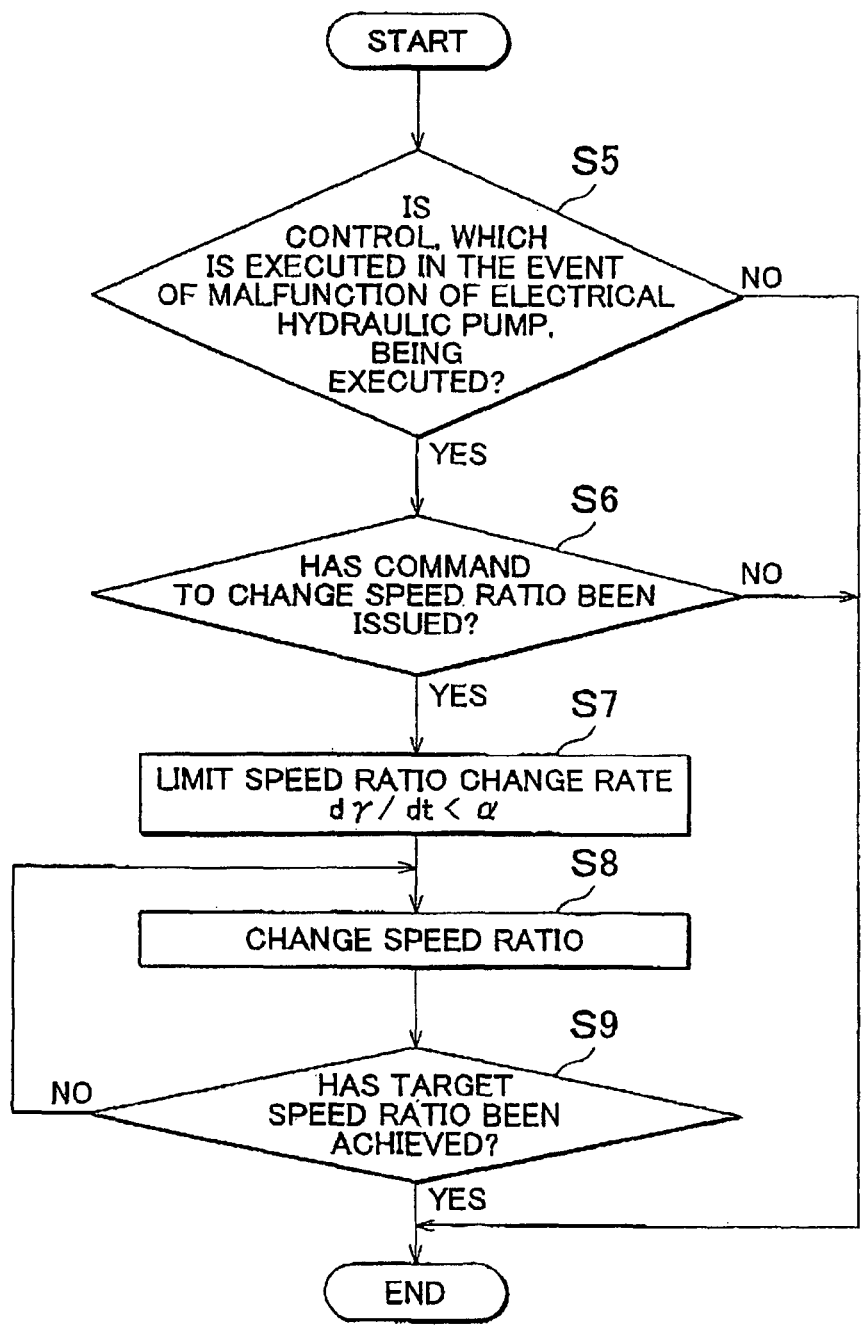
FIG. 2 is a flowchart schematically showing an example of a control that is executed to change the speed ratio of a continuously variable transmission according to the embodiment of the invention.

As described above, the vehicle Ve is able to keep traveling even if a malfunction has occurred in the electrical hydraulic pump 16. Therefore, the speed ratio needs to be changed while the vehicle is traveling in some cases. FIG. 2 shows an example of a control for changing the speed ratio of the continuously variable transmission 4 in such cases. FIG. 2 is a flowchart for describing an example of the control. It is determined whether the control that is executed when a malfunction has occurred shown in FIG. 1 is being executed (S5). If an affirmative determination is made in S5, it is determined whether a command to change the speed ratio of the continuously variable transmission 4 has been issued (S6). Whether a command to change the speed ratio has been issued is determined based on the required amount of drive power, which is determined based on, for example, the vehicle speed V or the accelerator pedal depression amount, or the vehicle speed V. If a command to change the speed ratio has been issued, an affirmative determination is made in S6. On the other hand, in the steady travel state in which the accelerator pedal operation amount and the vehicle speed V are maintained substantially constant, the speed ratio and the belt holding force are maintained constant. Therefore, the speed ratio need not be changed, and a negative determination is made in S6.

If an affirmative determination is made in S6, the speed ratio change rate limit value $\alpha$, which is used when the speed ratio of the continuously variable transmission 4 is changed, is calculated, and the target speed ratio change rate $d\gamma/dt$ is limited so that the speed ratio is changed at a change rate equal to or lower than the calculated speed ratio change rate limit value $\alpha$ (S7).

As described above, if a malfunction has occurred in the electrical hydraulic pump 16, the flow volume and the hydraulic pressure of the hydraulic fluid that are used to change the speed ratio are achieved by the mechanical hydraulic pump 14. Therefore, the speed ratio needs to be changed based on the flow volume and the hydraulic pressure of the hydraulic fluid that may be achieved by the mechanical hydraulic pump 14. That is, the speed ratio change rate that is used when the speed ratio is changed is determined based on the flow volume and the hydraulic pressure of the hydraulic fluid that are achieved by the mechanical hydraulic pump 14. That is, first, the speed ratio change rate limit value $\alpha$ that is used when the speed ratio is changed is calculated based on the parameter that indicates the operating state of the mechanical hydraulic pump 14. Next, the target speed ratio change rate $d\gamma/dt$ is limited so that the speed ratio is changed at a rate equal to or lower than the speed ratio change rate limit value $\alpha$. The speed ratio change rate limit value $\alpha$ corresponding to the mechanical hydraulic pump 14 is calculated to accommodate the variation in the pump performance of the pumps that generate the hydraulic pressure and supply the hydraulic fluid.

The speed ratio change rate limit value $\alpha$ is calculated using, as the parameters, the pressure receiving area $A_s$ of each of the sheaves of the drive pulley 5 and the driven pulley 6 the target speed ratio $\gamma_{TRG}$, the actual speed ratio $\gamma_{NOW}$, the speed ratio change time t, the rotational speed $R_{MOP}$ (rpm) of the pump directly connected to the engine, and the capacity $V_{MOP}$ (ml/rev) of the pump directly connected to the engine.

Subsequent to the control in S7, the change rate of the speed ratio of the continuously variable transmission 4 is limited to a value equal to or lower than the speed ratio change rate limit value $\alpha$ calculated in S7, and the target speed ratio change rate $d\gamma/dt$ is set to a value equal to or lower than the target speed ratio change rate limit value $\alpha$, and the speed ratio is changed at the target speed ratio change rate $d\gamma/dt$ (S8).

Next, it is determined whether the speed ratio has been changed to the target speed ratio (S9). More specifically, the speed ratio of the continuously variable transmission 4 is controlled by executing the open-close control over the supply-side on-off value DSP1 and the drain-side on-off value DSP2 to adjust the flow volume or the hydraulic pressure of the hydraulic fluid. Therefore, it is determined whether the speed ratio has been changed to the target speed ratio based on the amount of change in the movement amount of the movable sheave of the drive pulley 5, the result of comparison between the target speed ratio and the actual speed ratio, which is the ratio between the engine speed or the input rotational speed and the output rotational speed, or the result of comparison between the pressure at the actuator 7 for the drive pulley 5 and the pressure at the actuator 8 of the driven pulley 6. If the speed ratio has been changed to the target speed ratio, an affirmative determination is made in S9. On the other hand, if the speed ratio has not been changed to the target speed ratio, a negative determination is made in S9.

If an affirmative determination is made in S9, that is, if it is determined that the speed ratio has been changed to the target speed ratio, the routine ends. On the other hand, if a negative determination is made in S9, S8 is executed again and the control for changing the speed ratio is continued. If a negative determination is made in S5, that is, if it is determined that a malfunction has not occurred in the electrical hydraulic pump 16, the routine ends. If a negative determination is made in S6, the speed ratio is not changed. Therefore, the routine ends.

Therefore, as described above, even if a malfunction has occurred in the electrical hydraulic pump 16, it is possible to change the speed ratio of the continuously variable transmission 4 because the hydraulic pressure is supplied from the mechanical hydraulic pump 14. Accordingly, even if a malfunction has occurred in the electrical hydraulic pump 16, the vehicle Ve is able to keep traveling. In addition, it is possible to change the speed ratio based on the road surface condition and the traveling state. Further, it is possible to reliably achieve the required flow volume and hydraulic pressure of the hydraulic fluid. Therefore, it is possible to avoid the situation where the belt holding force is reduced due to the insufficient flow volume and hydraulic pressure of the hydraulic fluid or the vehicle Ve is unable to travel due to slippage of the belt.

Figure 3:
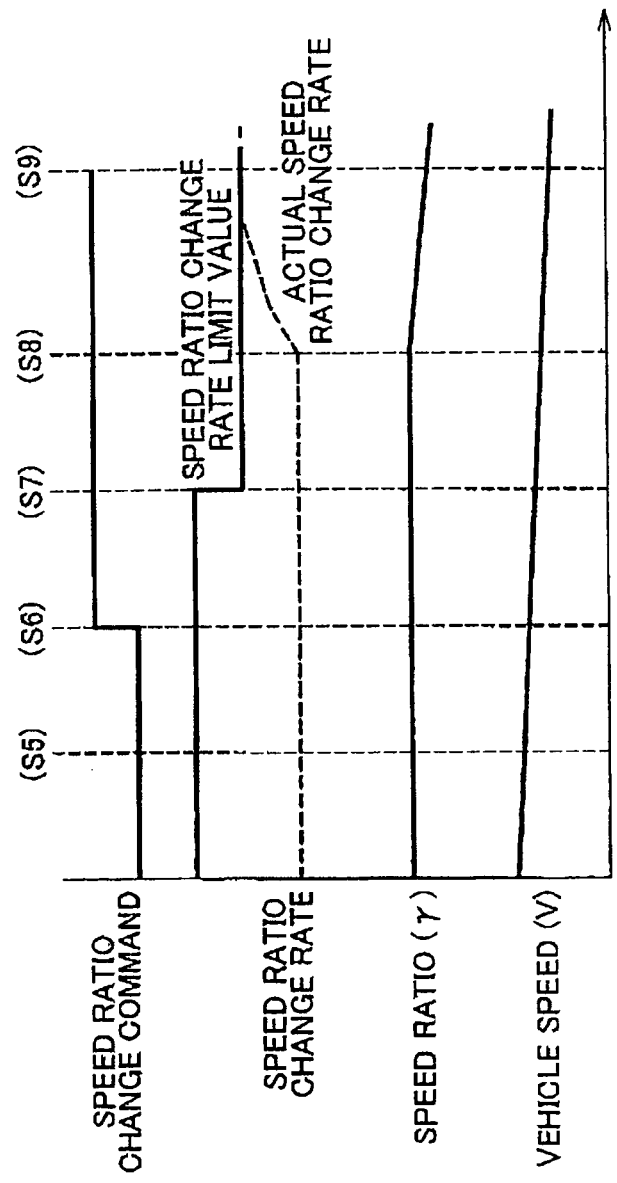
FIG. 3 is a time chart schematically showing the control that is executed to change the speed ratio of the continuously variable transmission.

FIG. 3 is a time chart showing an example of the control for changing the speed ratio of the continuously variable transmission 4. The actual speed ratio change rate when a malfunction has occurred in the electrical hydraulic pump 16 is as indicated by the dashed line in FIG. 3. The speed ratio change rate limit value α calculated in S7 is a so-called permissible value of the speed ratio change rate. Therefore, when the speed ratio is changed in S8, the speed ratio change rate is limited by the speed ratio change rate limit value α. As a result, the speed ratio change rate does not exceed the speed ratio change rate limit value α, in other words, the speed ratio is changed slowly. Accordingly, the volume of hydraulic fluid that is required to change the speed ratio is reduced. In addition, even when the mechanical hydraulic pump 14 is used as a high hydraulic pressure source, it is possible to achieve the required speed ratio.

Figure 4:
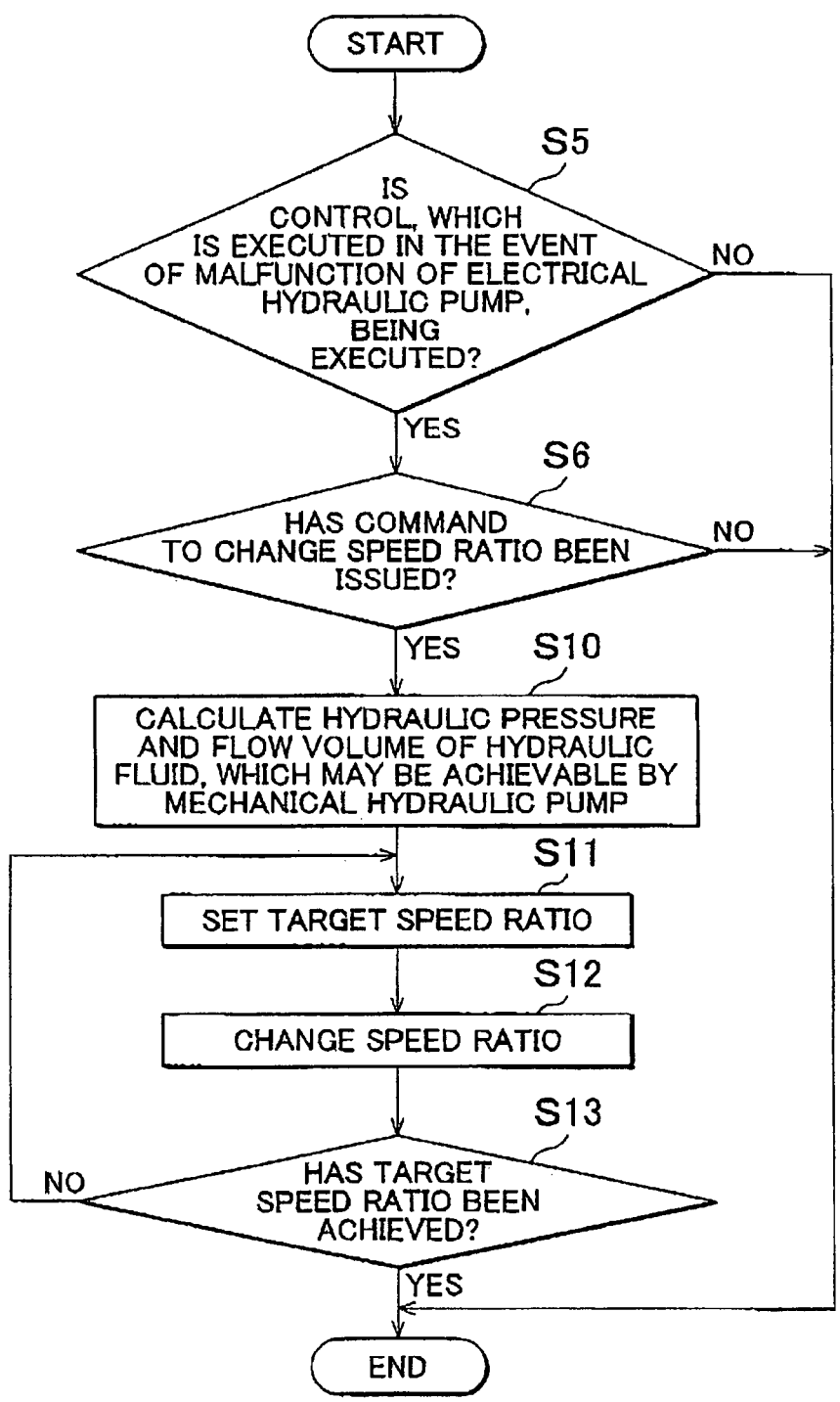
FIG. 4 is a flowchart schematically showing another example of a control that is executed to change the speed ratio of the continuously variable transmission according to the embodiment of the invention.

FIG. 4 shows another example of the control that is executed to change the speed ratio of the continuously variable transmission 4. FIG. 4 is a flowchart for describing the other example. As in S5 in FIG. 2 described above, it is determined whether the control, which is executed when a malfunction has occurred, is being executed (S5). If an affirmative determination is made in S5, it is determined whether a command to change the speed ratio has been issued (S6), as in S6 in FIG. 2.

If an affirmative determination is made in S6, the flow volume and the hydraulic pressure of the hydraulic fluid, which may be achieved by the mechanical hydraulic pump 14 when the speed ratio of the continuously variable transmission 4 is changed, are calculated, and the speed ratio change permissible range Δγ is calculated based on the calculated flow volume and hydraulic pressure (S10). If a malfunction has occurred in the electrical hydraulic pump 16, the hydraulic pressure and the flow volume of the hydraulic fluid for changing the speed ratio are achieved by the mechanical hydraulic pump 14. However, the hydraulic pressure and the flow volume of the hydraulic fluid that may be achieved by the pump depend on the performance of the pump that is the target of the control. Therefore, when the speed ratio of the continuously variable transmission 4 is changed by the hydraulic pressure that is generated by the mechanical hydraulic pump 14, it is necessary to prevent a decrease in the hydraulic pressure that is required to change the speed ratio and shortage in the flow volume of the hydraulic fluid. Accordingly, in S10, the flow volume and the hydraulic pressure of the hydraulic fluid that may be achieved by the mechanical hydraulic pump 14 are calculated, and the speed ratio change permissible range Δγ is calculated based on the calculated flow volume and hydraulic pressure. If the hydraulic pressure is supplied from the mechanical hydraulic pump 14, the detection signals from the hydraulic sensors 29 and 30 may be used to calculate the speed ratio change permissible range Δγ.

When the hydraulic fluid is supplied from the mechanical hydraulic pump 14 to the high hydraulic pressure supplied portion 3, the speed ratio change permissible range Δγ for the continuously variable transmission 4 is determined based on the performance of the mechanical hydraulic pump 14. Accordingly, the speed ratio change permissible range Δγ is calculated using, as the parameters, the pressure-receiving area $A_S$ of each of the sheaves of the drive pulley 5 and the driven pulley 6, the target speed ratio $\gamma_{TRG}$, the actual speed ratio $\gamma_{NOW}$, the remaining capacity $Q_{ACC}$ of the accumulator 19, the rotational speed $R_{MOP}$ (rpm) of the pump directly connected to the engine 13, and the capacity $V_{MOP}$ (ml/rev) of the pump directly connected to the engine 13.

Subsequent to or in parallel with the control in S10, the target speed ratio $\gamma_{TRG}$ for the continuously variable transmission 4, which is limited by the speed ratio change permissible range Δγ, is calculated (S11). This is expressed by the following equation.

$$|\text{Target speed ratio } \gamma_{TRG}\text{-actual speed ratio } \gamma_{NOW}| < \text{speed ratio change permissible range } \Delta\gamma \qquad (3)$$

The speed ratio change permissible range Δγ is a range within which the absolute value of the difference between the current speed ratio and the speed ratio that will be achieved should fall if a malfunction has occurred in the electrical hydraulic pump 16 and the hydraulic fluid is supplied from the mechanical hydraulic pump 14. In other words, the speed ratio change permissible range Δγ corresponds to a range of movement amount by which the movable sheave of the drive pulley 5 is allowed to move from the current position. Therefore, the target speed ratio $\gamma_{TRG}$ is set to a value at which Equation 3 is satisfied.

Subsequent to S11, the speed ratio is changed (S12). In this case, the actual speed ratio change amount, which corresponds to the actual amount by which the movable sheave of the drive pulley 5 is moved, is the absolute value of the value obtained by subtracting the current speed ratio $\gamma_{NOW}$ from the target speed ratio $\gamma_{TRG}$.

Next, it is determined whether the speed ratio has been changed to the target speed ratio (S13). More specifically, as in S9 in FIG. 2, it is determined whether the speed ratio has been changed to the target speed ratio based on the amount by which the movable sheave 7 of the drive pulley 5 is changed, the result of comparison between the target speed ratio and the actual speed ratio, which is the ratio between the engine speed or the input rotational speed and the output rotational speed, or the result of comparison between the pressure at the actuator 7 for the drive pulley 5 and the pressure of the actuator 8 of the driven pulley 6. If the speed ratio has been changed to the target sped ratio, an affirmative determination is made in S13. On the other hand, if the speed ratio has not been changed to the target speed ratio, a negative determination is made in S13.

If an affirmative determination is made in S13, that is, if it is determined that the speed ratio has been changed to the target speed ratio, the routine ends. On the other hand, if a negative determination is made in S13, S11 is executed again and the control for changing the speed ratio is continued.

In the other example of the control shown in FIG. 4, instead of the electrical hydraulic pump 16 in which a malfunction has occurred, the mechanical hydraulic pump 14 generates a relatively high hydraulic pressure and supplies the hydraulic fluid. In addition, when the speed ratio is changed, the speed ratio change permissible range $\Delta\gamma$ is calculated based on the flow volume and the hydraulic pressure of the hydraulic fluid that may be achieved by the mechanical hydraulic pump 14, the target speed ratio $\gamma_{TRG}$ is calculated in such a manner that the difference between the current speed ratio and the target speed ratio $\gamma_{TRG}$ falls within the speed ratio change permissible range $\Delta\gamma$, and then the speed ratio is changed. In such a case, if downshifting is performed, that is, the speed ratio is increased, the engine 13 is rotated by the inertia torque of the vehicle Ve and the engine speed is increased, and so-called engine brake is applied. Then, the rotational speed of the mechanical hydraulic pump 14 is increased with an increase in the engine speed. Therefore, the hydraulic pressure that may be generated by the mechanical hydraulic pump 14 is increased, and the flow volume of the hydraulic fluid that may be supplied from the mechanical hydraulic pump 14 is increased.

Figure 5:
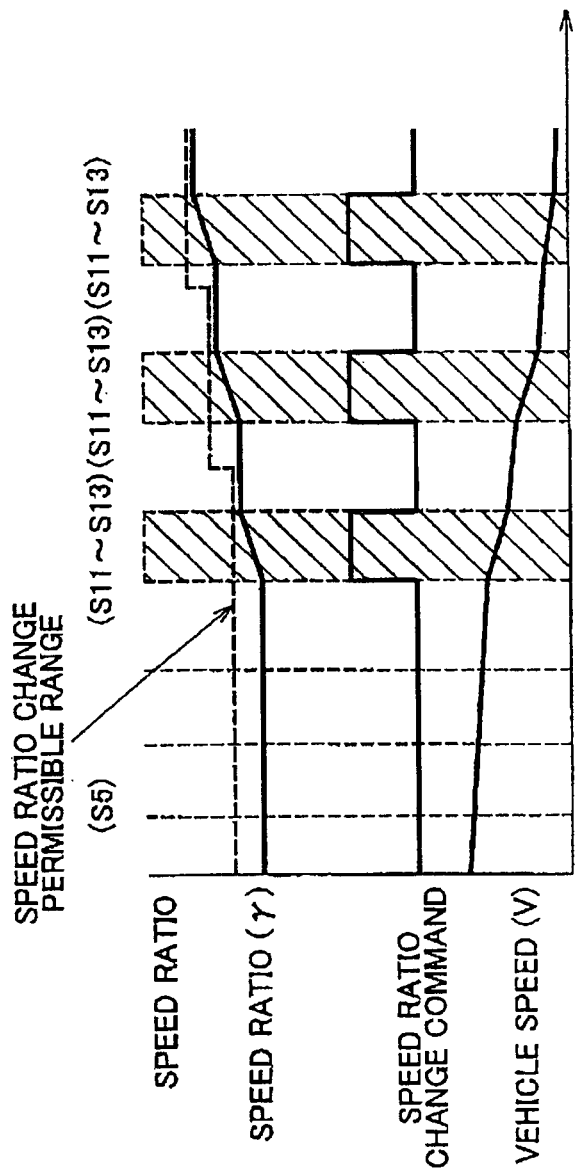
FIG. 5 is a time chart schematically showing the other example of the control that is executed to change the speed ratio of the continuously variable transmission.

More specific description will be provided below. FIG. 5 is a time chart schematically showing the control shown in FIG. 4. The dashed line indicates the speed ratio change permissible range $\Delta\gamma$. If it is determined in S6 that a command to change the speed ratio has been issued, the flow volume and the hydraulic pressure of the hydraulic fluid that may be supplied from the mechanical hydraulic pump 14 to the high hydraulic pressure supplied portion 3 are calculated in S10, and the speed ratio change permissible range $\Delta\gamma$ is calculated based on the calculated flow volume and hydraulic pressure. In the case where downshifting is performed, that is, in the case where the target speed ratio $\gamma_{TRG}$ is higher than the current speed ratio $\gamma_{NOW}$, after the speed ratio is changed to the target speed ratio $\gamma_{TRG}$, the engine speed is increased by the inertia torque of the vehicle Ve. Therefore, the rotational speed of the mechanical hydraulic pump 14 is increased with an increase in the engine speed. Then, the volume of hydraulic fluid that is discharged from the mechanical hydraulic pump 14 is increased. Accordingly, the hydraulic pressure of the hydraulic fluid that is supplied from the mechanical hydraulic pump 14 is adjusted to a higher pressure, and the flow volume of the hydraulic fluid is increased. Therefore, it is possible to set the speed ratio change permissible range $\Delta\gamma(i)$ to a range that is larger than the preceding speed ratio change permissible range $\Delta\gamma(i-1)$. In other words, even if it is not possible to change the speed ratio to the required speed ratio by executing the speed ratio change control once because the speed ratio change permissible range $\Delta\gamma$ is set, the speed ratio is changed in a stepwise manner and the target speed ratio is ultimately achieved by executing the control several times.

Therefore, as described above, even if a malfunction has occurred in the electrical hydraulic pump 16, the control is executed so that the speed ratio is changed. Therefore, it is possible to maintain the drive state as much as possible, and the vehicle Ve is able to keep traveling. In addition, it is possible to change the speed ratio based on the road surface condition and the traveling state. Further, it is possible to achieve the required flow volume and hydraulic pressure of the hydraulic fluid. Accordingly, it is possible to avoid the situation where the belt holding force is reduced due to insufficient flow volume and hydraulic pressure of the hydraulic fluid, and the situation where the vehicle Ve is not able to travel due to slippage of the belt.

If a negative determination is made in S5, that is, it is determined that a malfunction has not occurred in the electrical hydraulic pump 16, the routine ends. If a negative determination is made in S6, the routine ends because the speed ratio is not changed.

If a malfunction has occurred in the electrical hydraulic pump 16 that supplies the hydraulic fluid to the continuously variable transmission 4, the hydraulic fluid is supplied from the mechanical hydraulic pump 14.

Figure 6:
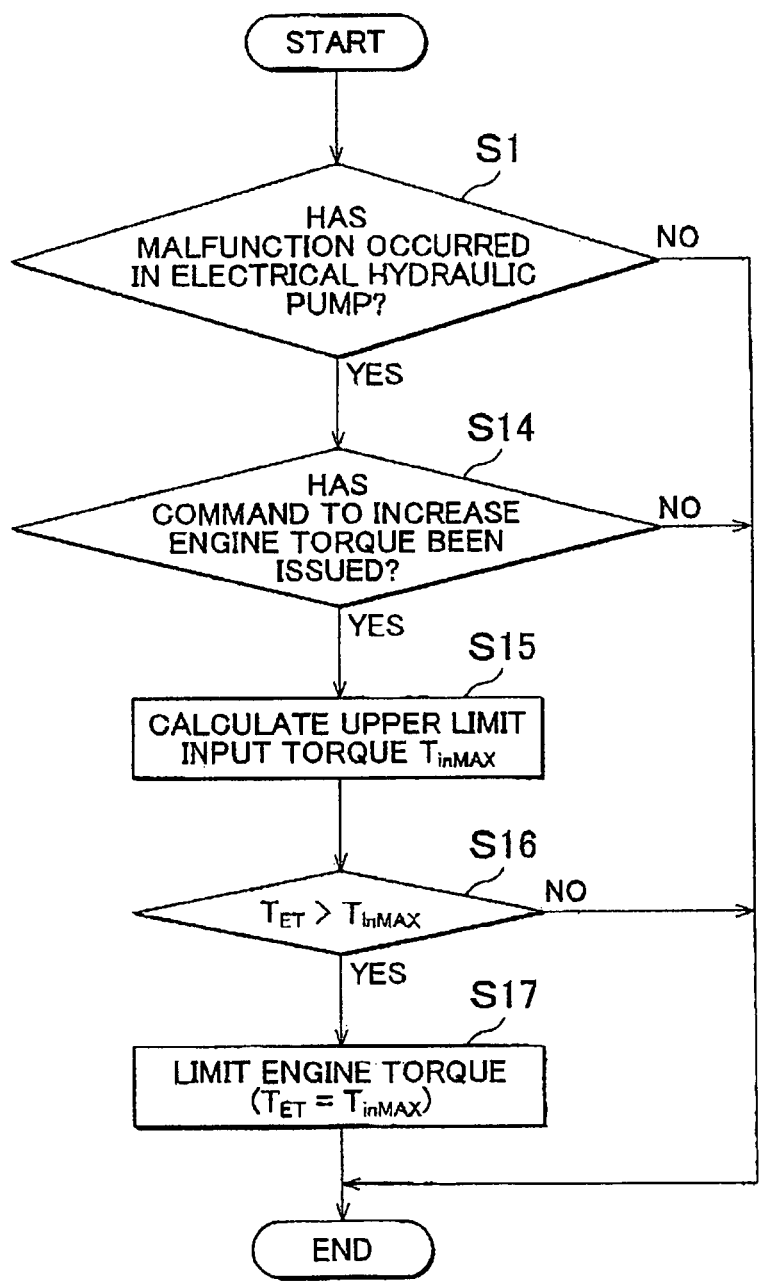
FIG. 6 is a flowchart schematically showing an example of a control that is executed to limit a torque that is input in the continuously variable transmission according to the embodiment of the invention.

FIG. 6 shows an example of a control for limiting the torque that is input in the continuously variable transmission 4. FIG. 6 is a flowchart for describing an example of the control. As in S1 in FIG. 1, it is determined whether a malfunction has occurred in the electrical hydraulic pump 16 (S1). If an affirmative determination is made in S1, it is determined whether a command to increase the torque that is transmitted from the engine 13 to the continuously variable transmission 4 has been issued (S14). Whether a command to increase the torque that is input in the continuously variable transmission 4 has been issued is determined based on the amount of drive power required of the engine 13, which is determined based on, for example, the vehicle speed V or the accelerator pedal depression amount. If a command to increase the torque that is input in the continuously variable transmission 4 has been issued, an affirmative determination is made in S14. On the other hand, in the steady travel state in which a command to increase the torque that is input in the continuously variable transmission 4 has not been issued and the accelerator pedal operation amount and the vehicle speed V are maintained substantially constant, the vehicle speed V, the speed ratio and the belt holding force are maintained substantially constant. Therefore, a negative determination is made in S14.

In the case where the torque output from the engine 13 is input in the continuously variable transmission 4 via the torque converter 10 that includes a lockup clutch, if the lockup clutch is fully engaged, the engine torque coincides with the torque that is input in the continuously variable transmission 4. On the other hand, if the lockup clutch slips or is disengaged so that the lock up clutch does not transmit the power, the torque that is obtained by increasing the engine torque with the use of the torque converter is the torque that is input in the continuously variable transmission 4.

If an affirmative determination is made in S14, the upper limit input torque $T_{inMAX}$ that is the upper limit of the torque that may be input in the continuously variable transmission 4 is calculated (S15). The continuously variable transmission 4 is controlled by the hydraulic fluid that is supplied from the mechanical hydraulic pump 14 if a malfunction has occurred in the electrical hydraulic pump 16, as described above. Therefore, it is necessary to execute the control based on the flow volume and the hydraulic pressure of the hydraulic fluid that is supplied from the mechanical hydraulic pump 14 to the continuously variable transmission 4, and the upper limit input torque $T_{inMAX}$, which is the upper limit of the torque that may be input from the engine 13 to the continuously variable transmission 4, is calculated based on the flow volume and the hydraulic pressure that may be achieved from the mechanical hydraulic pump 14. In other words, the upper limit input torque $T_{inMAX}$ is a limit value (limit torque) that is used to avoid the situation where a malfunction is caused in the continuously variable transmission 4 by the torque that is input in the continuously variable transmission 4 from the engine 13.

The upper limit input torque $T_{inMAX}$ is calculated using, for example, the current speed ratio $\gamma_{NOW}$, the engine speed $N_{in}$ (rpm), and the hydraulic pressure $P_{SUP}$ that may be supplied from the mechanical hydraulic pump 14 as the parameters.

Subsequent to the control in S15, it is determined whether the torque that is required of the engine 13 exceeds the upper limit input torque $T_{inMAX}$ (S16). This is expressed by the following equation.

Required engine torque $T_{ET}$>upper limit input torque $T_{inMAX}$     (4)

The upper limit input torque $T_{inMAX}$ is a limit value that is used so as not to cause a malfunction in the continuously variable transmission 4. Therefore, when the engine 13 and the continuously variable transmission 4 are connected directly to each other and the torque that is input in the continuously variable transmission 4 coincides with the engine torque, if the required engine torque $T_{ET}$, which is required to be input in the continuously variable transmission 4, satisfies Equation 4, an affirmative determination is made in S16. On the other hand, if the required engine torque $T_{ET}$ does not exceed the upper limit input torque $T_{inMAX}$ and does not satisfy Equation 4, a negative determination is made in S16. In this case, the drive state of the vehicle Ve may not be maintained and the vehicle Ve may not be able to travel properly. Accordingly, if the torque that is input in the continuously variable transmission 4 exceeds the upper limit input torque $T_{inMAX}$, the required engine torque $T_{ET}$ is limited to a value equal to or lower than the upper limit input torque $T_{inMAX}$.

In this way, the torque that is input in the continuously variable transmission 4 is limited to a value equal to or lower than the upper limit input torque $T_{inMAX}$ (S17). If the required engine torque $T_{ET}$ exceeds the upper limit input torque $T_{inMAX}$, the required engine torque $T_{ET}$ is set to the upper limit input torque $T_{inMAX}$ (S17). This is expressed by the following equation.

Required engine torque $T_{ET}$=upper limit input torque $T_{inMAX}$

The mechanical hydraulic pump 14 is driven by the engine 13 and generates the hydraulic pressure. Accordingly, the hydraulic pressure of the hydraulic fluid, which is generated by the mechanical hydraulic pump 14, is changed with a change in the drive state of the engine 13. Accordingly, the upper limit input torque $T_{inMAX}$ of the engine torque, which may be input in the continuously variable transmission 4, is changed with a change in the drive state of the engine 13.

As described above, even if a malfunction has occurred in the electrical hydraulic pump 16, the required flow volume and hydraulic pressure of the hydraulic fluid are achieved. Accordingly, it is possible to suppress shortage of the flow volume and the hydraulic pressure of the hydraulic fluid, and to maintain the drive state as much as possible. As a result, the vehicle Ve is able to keep traveling.

If a negative determination is made in S1, the routine ends because a malfunction has not occurred in the electrical hydraulic pump 16. If a negative determination is made in S14, a command to increase the torque that is input in the continuously variable transmission 4 has not been issued. Therefore, the routine ends. If a negative determination is made in S16, the required engine torque $T_{ET}$ does not exceed the upper limit input torque $T_{inMAX}$. Accordingly, it is not necessary to limit the torque that is input in the continuously variable transmission 4. Therefore, the routine ends.

A functional unit that executes S1 may function as a malfunction detection unit according to the invention. A functional unit that executes S2 and S3 may function as a discharge pressure increasing unit according to the invention. A functional unit that executes S7 may function as a speed ratio change rate limiting unit according to the invention. A functional unit that executes S10 and S11 may function as a speed ratio range setting unit. A functional unit that executes S15, S16 and S17 may function as an input torque limiting unit according to the invention.

While the invention has been described with reference to the example embodiment thereof, it is to be understood that the invention is not limited to the example embodiment. To the contrary, the invention is intended to cover various modifications and equivalent arrangements. In addition, while the various elements of the example embodiment are shown in various combinations and configurations, which are exemplary, other combinations and configurations, including more, less or only a single element, are also within the scope of the invention.

The invention claimed is:

1. A hydraulic control apparatus, comprising:
   a high hydraulic pressure supplied portion which includes a continuously variable transmission mounted in a vehicle, and to which a relatively high hydraulic pressure is supplied from an electrical hydraulic pump that is driven by a motor;
   a low hydraulic pressure supplied portion to which a hydraulic pressure that is lower than the hydraulic pressure supplied from the electrical hydraulic pump is supplied from a mechanical hydraulic pump that is driven by an engine;
   a malfunction detection unit that determines whether the electrical hydraulic pump malfunctions;
   a discharge pressure increasing unit that increases a volume of hydraulic fluid that is discharged from the mechanical hydraulic pump and increases the hydraulic pressure that is generated by the mechanical hydraulic pump, if the malfunction detection unit determines that the electrical hydraulic pump malfunctions; and
   an oil supply passage through which, when the hydraulic pressure that is generated by the mechanical hydraulic pump is increased to a relatively high hydraulic pressure by the discharge pressure increasing unit, at least part of the hydraulic fluid of which the hydraulic pressure is increased to the relatively high hydraulic pressure is supplied to the high hydraulic pressure supplied portion the hydraulic control apparatus further comprising:
   an input torque limiting unit that calculates an upper limit input torque which is an upper limit of a torque that is allowed to be input in the high hydraulic pressure supplied portion based on a volume or a hydraulic pressure of hydraulic fluid that is allowed to be supplied to the high hydraulic pressure supplied portion and that limits a torque that is input from the engine to the high hydraulic pressure supplied portion, if the malfunction detection unit determines that the electrical hydraulic pump malfunctions.

2. The hydraulic control apparatus according to claim 1, wherein if the malfunction detection unit determines that the electrical hydraulic pump malfunctions, the discharge pressure increasing unit increases a rotational speed of the engine in response to a command to increase the hydraulic pressure that is supplied from the mechanical hydraulic pump.

3. The hydraulic control apparatus according to claim 1, further comprising:
   a speed ratio change rate limiting unit that limits a rate of change in a speed ratio, which is caused by the continuously variable transmission in response to a speed ratio change command, to a value equal to or lower than a value that is determined based on a parameter that indicates an operating state of the mechanical hydraulic pump, if the malfunction detection unit determines that the electrical hydraulic pump malfunctions.

4. The hydraulic control apparatus according to claim 1, wherein:
the continuously variable transmission is a belt continuously variable transmission in which a groove width of a pulley over which a belt is looped is changed by moving a movable sheave of the pulley using a hydraulic pressure; and
the hydraulic control apparatus further includes a speed ratio change range limiting unit that limits a range of speed ratio change that is caused by the belt continuously variable transmission in response to a speed ratio change command, if the malfunction detection unit determines that the electrical hydraulic pump malfunctions.

5. The hydraulic control apparatus according to claim 4, wherein a control for changing the speed ratio to a target speed ratio that is limited by the range of speed ratio change is repeatedly executed until a required speed ratio is achieved.

6. The hydraulic control apparatus according to claim 5, wherein the range of speed ratio change is changed each time the speed ratio is changed to the target speed ratio.

7. The hydraulic control apparatus according to claim 4, wherein:
a moving range for the movable sheave is set based on a volume or a hydraulic pressure of a hydraulic fluid that is supplied to the high hydraulic pressure supplied portion; and
the speed ratio change range limiting unit limits a target speed ratio in such a manner that the speed ratio changes within a range of speed ratio change, which corresponds to the set moving range for the movable sheave.

8. The hydraulic control apparatus according to claim 7, wherein the hydraulic fluid having the volume or the hydraulic pressure based on which the moving range for the movable sheave is set is supplied to the high hydraulic pressure supplied portion from the mechanical hydraulic pump.

9. The hydraulic control apparatus according to claim 1, wherein the malfunction detection unit determines that the electrical hydraulic pump malfunctions if a difference between the hydraulic pressure that is actually supplied to the high hydraulic pressure supplied portion and a command hydraulic pressure for the electrical hydraulic pump is equal to or larger than a predetermined value.

10. The hydraulic control apparatus according to claim 1, wherein:
an amount by which the hydraulic pressure that is generated by the mechanical hydraulic pump is increased is set to a maximum value of the hydraulic pressure that is generated by the electrical hydraulic pump; and
an amount by which the amount of hydraulic fluid that is discharged from the mechanical hydraulic pump is increased is set to an amount of hydraulic fluid that is discharged from the electrical hydraulic pump.

11. A method for controlling a hydraulic apparatus that includes a high hydraulic pressure supplied portion which includes a continuously variable transmission mounted in a vehicle, and to which a relatively high hydraulic pressure is supplied from an electrical hydraulic pump that is driven by a motor, and a low hydraulic pressure supplied portion to which a hydraulic pressure that is lower than the hydraulic pressure supplied from the electrical hydraulic pump is supplied from a mechanical hydraulic pump that is driven by an engine, comprising:
determining whether the electrical hydraulic pump malfunctions;
increasing a volume of hydraulic fluid that is discharged from the mechanical hydraulic pump and increasing the hydraulic pressure that is generated by the mechanical hydraulic pump, if it is determined that the electrical hydraulic pump malfunctions; and
supplying, when the hydraulic pressure that is generated by the mechanical hydraulic pump is increased to a relatively high hydraulic pressure, at least part of the hydraulic fluid of which the hydraulic pressure is increased to the relatively high hydraulic pressure to the high hydraulic pressure supplied portion, and calculating an upper limit input torque which is an upper limit of torque that is allowed to be input in the high hydraulic pressure supplied portion based on a volume or a hydraulic pressure of hydraulic fluid that is allowed to be supplied to the high hydraulic pressure supplied portion and limiting a torque that is input from the engine to the high hydraulic pressure supplied portion, if it is determined that the electrical hydraulic pump malfunctions.

* * * * *